United States Patent
Lee et al.

(10) Patent No.: US 9,965,631 B2
(45) Date of Patent: May 8, 2018

(54) APPARATUS AND METHOD FOR ANALYZING MALICIOUS CODE IN MULTI-CORE ENVIRONMENT USING A PROGRAM FLOW TRACER

(71) Applicant: Electronics and Telecommunications Research Institute, Daejeon (KR)

(72) Inventors: Sang-Rok Lee, Daejeon (KR); Jung-Hee Lee, Daejeon (KR); Byung-Chul Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 15/074,497

(22) Filed: Mar. 18, 2016

(65) Prior Publication Data

US 2017/0083705 A1 Mar. 23, 2017

(30) Foreign Application Priority Data

Sep. 22, 2015 (KR) .................. 10-2015-0133748

(51) Int. Cl.
*G06F 21/00* (2013.01)
*G06F 21/56* (2013.01)

(52) U.S. Cl.
CPC ................. *G06F 21/566* (2013.01)

(58) Field of Classification Search
CPC .................................................. G06F 21/566
See application file for complete search history.

(56) References Cited

U.S. PATENT DOCUMENTS

| | | | | |
|---|---|---|---|---|
| 7,370,360 B2* | 5/2008 | van der Made | ...... | G06F 21/563 713/187 |
| 8,555,386 B1* | 10/2013 | Belov | .................. | G06F 21/566 726/22 |
| 9,076,017 B2* | 7/2015 | Addepalli | ............. | G06F 12/145 |
| 9,335,998 B2* | 5/2016 | Suzuki | ................ | G06F 9/30043 |

(Continued)

FOREIGN PATENT DOCUMENTS

| | | | |
|---|---|---|---|
| JP | 5516747 B2 | 6/2014 | |
| JP | 5750172 B2 | 7/2015 | |

(Continued)

OTHER PUBLICATIONS

Kirat, D. et al., "BareBox: Efficient Malware Analysis on Bare-Metal," ACSAC, 10 pages (2011).

(Continued)

*Primary Examiner* — Ali Shayanfar
(74) *Attorney, Agent, or Firm* — Nelson Mullins Riley & Scarborough LLP; Anthony A. Laurentano

(57) ABSTRACT

Disclosed herein are an apparatus and method for analyzing malicious code in a multi-core environment. The apparatus for analyzing malicious code includes a core setting unit for setting at least one monitoring core, on which malicious code is to be monitored, among cores of a multi-core Central Processing Unit (CPU), and executing a monitoring program on the monitoring core, a behavioral information collection unit for, when execution cores that are not set as the monitoring core execute analysis target code, collecting pieces of behavioral information using the monitoring program and a hardware debugging device, and a storage unit for storing the behavioral information.

12 Claims, 6 Drawing Sheets

(56) References Cited

U.S. PATENT DOCUMENTS

| | | | |
|---|---|---|---|
| 9,501,135 B2 | 11/2016 | Wu et al. | |
| 9,684,870 B2* | 6/2017 | Fawaz | G06N 5/043 |
| 9,690,928 B2* | 6/2017 | Saxena | G06F 21/445 |
| 2004/0003203 A1* | 1/2004 | Ukai | G06F 9/3804 |
| | | | 712/205 |
| 2004/0243829 A1* | 12/2004 | Jordan | G06F 21/566 |
| | | | 726/24 |
| 2006/0026685 A1* | 2/2006 | Saito | G06F 21/52 |
| | | | 726/23 |
| 2007/0168699 A1* | 7/2007 | Nellitheertha | G06F 11/1441 |
| | | | 714/5.11 |
| 2013/0347131 A1* | 12/2013 | Mooring | G06F 9/45558 |
| | | | 726/29 |
| 2014/0143864 A1* | 5/2014 | Miliefsky | H04L 63/20 |
| | | | 726/22 |
| 2014/0181975 A1* | 6/2014 | Spernow | G06F 21/562 |
| | | | 726/23 |
| 2014/0223166 A1* | 8/2014 | Wu | G06F 1/3287 |
| | | | 713/100 |
| 2014/0259095 A1* | 9/2014 | Bryant | H04L 63/20 |
| | | | 726/1 |
| 2014/0281424 A1 | 9/2014 | Bobba et al. | |
| 2015/0082441 A1* | 3/2015 | Gathala | G06F 9/541 |
| | | | 726/25 |
| 2015/0161024 A1* | 6/2015 | Gupta | G06F 11/3612 |
| | | | 714/47.3 |
| 2015/0161386 A1* | 6/2015 | Gupta | G06F 11/3612 |
| | | | 726/23 |
| 2015/0301853 A1* | 10/2015 | Nandyalam | G06F 9/46 |
| | | | 718/105 |
| 2015/0324580 A1 | 11/2015 | Lee et al. | |
| 2016/0078362 A1* | 3/2016 | Christodorescu | G06N 99/005 |
| | | | 706/12 |
| 2016/0232353 A1* | 8/2016 | Gupta | G06F 21/566 |

FOREIGN PATENT DOCUMENTS

| | | |
|---|---|---|
| KR | 10-2007-0049511 A | 5/2007 |
| KR | 10-2011-0100923 A | 9/2011 |
| KR | 10-2014-0113462 A | 9/2014 |
| KR | 10-2015-0129357 A | 11/2015 |

OTHER PUBLICATIONS

Kirat, D. et al., "BareCloud: Bare-metal Analysis-based Evasive Malware Detection," USENIX, 15 pages (2014).

Royal, P., "Entrapment: Tricking Malware with Transparent, Scalable Malware Analysis," Blackhat 2012 Europe, 3 pages (2012).

* cited by examiner

APPARATUS AND METHOD FOR ANALYZING MALICIOUS CODE IN MULTI-CORE ENVIRONMENT USING A PROGRAM FLOW TRACER

CROSS REFERENCE TO RELATED APPLICATION

This application claims the benefit of Korean Patent Application No. 10-2015-0133748, filed Sep. 22, 2015, which is hereby incorporated by reference in its entirety into this application.

BACKGROUND OF THE INVENTION

1. Technical Field

The present invention relates generally to the analysis of malicious code and, more particularly, to technology for executing analysis target code suspected to be malicious code in a multi-core environment, thus detecting and analyzing the behavior of malicious code.

2. Description of the Related Art

When malicious code is analyzed, technology for detecting whether malicious behavior is included in suspicious files while directly executing the suspicious files on an emulator or a virtual machine, other than a client system, is chiefly used.

Technology for analyzing malicious code in a virtual environment is advantageous in that malicious behavior for each file is detected and executed on a separate virtual machine independent of a user system, and thus it is easy to separate such technology from a user environment.

Further, even if executed malicious code negatively influences the system, the system is initialized again, and thus it is possible to execute and determine each analysis target file in a new virtual environment within a short time period. Further, compared to a method for constructing an actual system, executing analysis target code, and determining whether malicious behavior has occurred, the time required for the restoration or the like of a system is greatly reduced, thus enabling malicious behavior to be easily detected in a large number of analysis target files.

However, pieces of malicious code for avoiding an analysis method using a virtual environment have recently appeared. That is, malicious code recognizes that a current environment is a virtual environment, and performs an operation different from that of a real environment in the virtual environment, thus making it difficult to analyze and detect malicious code.

The virtual environments of a Personal Computer (PC) chiefly used in a malicious code analysis system, include VMWare, Virtual-PC, Quick Emulator (QEMU)/Kernel Virtual Machine (KVM), etc., and the virtual environments of the Android Operating System (OS) include TaintDroid for analyzing malicious code, etc. Further, malicious code recognizes that a current environment is a virtual environment using various recognition methods for respective virtual environments.

In order to analyze malicious code that avoids a virtual environment in this way, malicious code must be executed in a real environment, such as a real hardware-based environment and a bare-metal system, and the behavior of target malicious code must be observed, extracted, and analyzed from the outside of the malicious code execution environment.

However, conventional technology is configured such that, after malicious code is executed, the changed state of a hard disk in a target system is extracted and then the behavior of the malicious code is determined. Since such a hard disk forensic method extracts only the results of malicious code exerted on a target system, it is impossible to extract information about detailed behavior occurring during the execution of the malicious code, thereby making it difficult to exactly analyze such behavior.

Also, there have appeared the methods of extracting and storing network packets that are transmitted to and received from the outside of an analysis target system to observe network behavior and analyzing the address of an external network which is accessed by malicious code, data about the network, etc. using the stored network packets. However, there is a disadvantage in that, when network communication is performed using data in which malicious code is encrypted, it is impossible to analyze the malicious code.

Therefore, malicious code analysis technology for enabling intermediate behavior on which malicious code is executed to be observed in real time while enabling external monitoring is required.

In connection with this, Korean Patent Application Publication No. 10-2007-0049511 (Date of publication: May 11, 2007) discloses a technology related to "Analysis System for Malicious Code and Method thereof."

SUMMARY OF THE INVENTION

Accordingly, the present invention has been made keeping in mind the above problems occurring in the prior art, and an object of the present invention is to monitor and analyze the behavior of malicious code that recognizes and bypasses a virtual machine and a sandbox.

Another object of the present invention is to enable a commercial CPU to be applied to PC- and mobile-based malicious code analysis without requiring an additional device, by utilizing the commercial CPU.

A further object of the present invention is to extract and analyze real-time behavior or intermediate behavior of malicious code as well as the results of behavior because malicious code is monitored outside of the environment in which the malicious code is executed.

In accordance with an aspect of the present invention to accomplish the above objects, there is provided an apparatus for analyzing malicious code, including a core setting unit for setting at least one monitoring core, on which malicious code is to be monitored, among cores of a multi-core Central Processing Unit (CPU), and executing a monitoring program on the monitoring core, a behavioral information collection unit for, when execution cores that are not set as the monitoring core execute analysis target code, collecting pieces of behavioral information using the monitoring program and a hardware debugging device, and a storage unit for storing the behavioral information.

The behavioral information collection unit may collect the behavioral information from shared resources that are shared by the cores of the multi-core CPU.

The shared resources may include at least one of a disk, memory, and cache and may be independent resources separate from the storage unit.

The behavioral information collected from the shared resources may include at least one of current status of an operating system, status of the analysis target code, and status of a system.

The current status of the operating system may include at least one of a list of processes in execution, a network socket, and a file descriptor, and the status of the analysis target code may include at least one of a stack and data in use.

The apparatus may further include a restoration unit for analyzing the status of the system using the collected behavioral information or restoring the system to status at a specific time.

The core setting unit may set a core on which the analysis target code is to be executed among execution cores.

The apparatus may further include an instruction extraction unit for extracting instructions executed by the execution cores using a program flow tracer and a program flow trace buffer installed on the CPU.

The program flow tracer may set information about whether a program flow is to be traced for each core by the monitoring core.

The storage unit may align and store the pieces of behavioral information based on at least one of behavior performance cores and behavior performance times corresponding to the pieces of behavioral information.

In accordance with another aspect of the present invention to accomplish the above objects, there is provided a method for analyzing malicious code using a malicious code analysis apparatus, including setting at least one monitoring core, on which malicious code is to be monitored, among cores of a multi-core Central Processing Unit (CPU), executing a monitoring program on the monitoring core, when execution cores that are not set as the monitoring core execute analysis target code, collecting pieces of behavioral information using the monitoring program and a hardware debugging device, and storing the behavioral information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
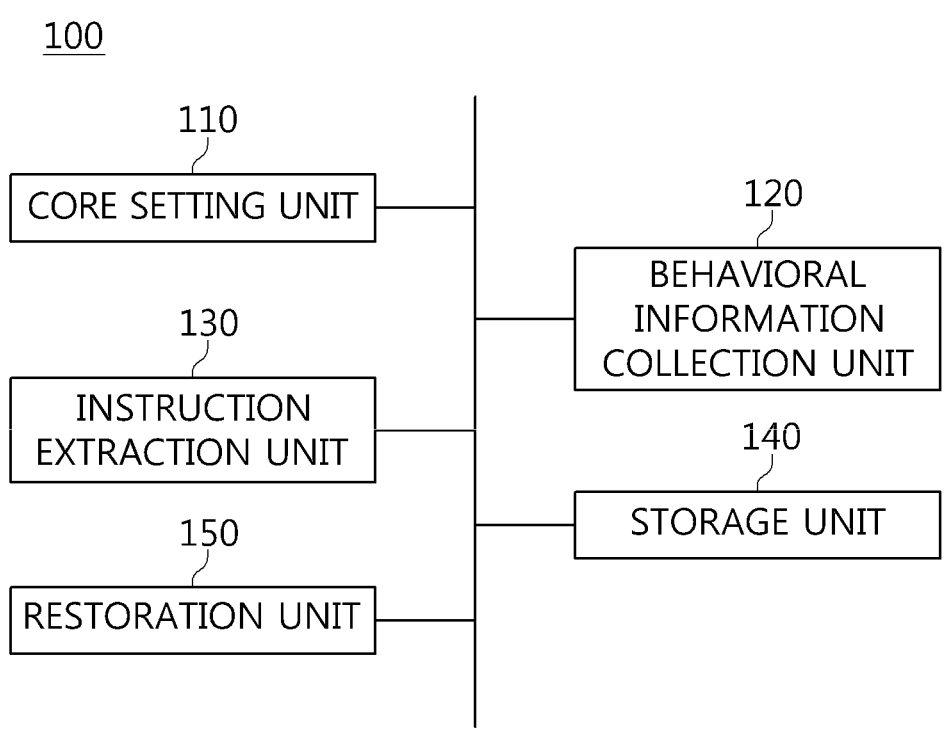
FIG. 1 is a block diagram showing the configuration of an apparatus for analyzing malicious code according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing the configuration of an apparatus for analyzing malicious code according to an embodiment of the present invention.

As shown in FIG. 1, an apparatus 100 for analyzing malicious code includes a core setting unit 110, a behavioral information collection unit 120, an instruction extraction unit 130, a storage unit 140, and a restoration unit 150.

First, the core setting unit 110 sets a monitoring core among multiple cores of a multi-core Central Processing Unit (CPU), and installs and executes a monitoring program on the monitoring core. Here, the monitoring core, which is configured to monitor the behavior of the CPU performed in other cores, executes the monitoring program and then monitors the other cores.

Further, the core setting unit 110 sets a core, on which analysis target code is to be executed, among execution cores which are not set as the monitoring core. The malicious code analysis apparatus 100 according to the embodiment of the present invention may narrow the range of monitoring by allowing the analysis target code to be executed on a selected specific core.

Further, the behavioral information collection unit 120 collects pieces of behavioral information using the monitoring program and a hardware debugging device when the execution core executes the analysis target code. Here, the behavioral information collection unit 120 may collect pieces of behavioral information from shared resources that are shared by the cores of the multi-core CPU.

Next, the instruction extraction unit 130 extracts instructions executed by the execution core using a program flow tracer and a program flow trace buffer installed in the CPU.

Further, the storage unit 140 stores the behavioral information collected by the behavioral information collection unit 120 and the instructions extracted by the instruction extraction unit 130. In this case, the storage unit 140 may align and store the pieces of behavioral information based on at least one of behavior performance cores and behavior performance times corresponding to the pieces of behavioral information.

Finally, the restoration unit 150 analyzes the status of the system using the collected behavioral information or the extracted instructions, or restores the system to status at a specific time.

When the analysis target code is malicious code, a system file may be damaged or modified due to the execution of the malicious code. In this case, the restoration unit 150 may restore the system using the collected behavioral information.

Hereinafter, a method for analyzing malicious code using the malicious code analysis apparatus according to an embodiment of the present invention will be described in greater detail with reference to FIGS. 2 to 6.

Figure 2:
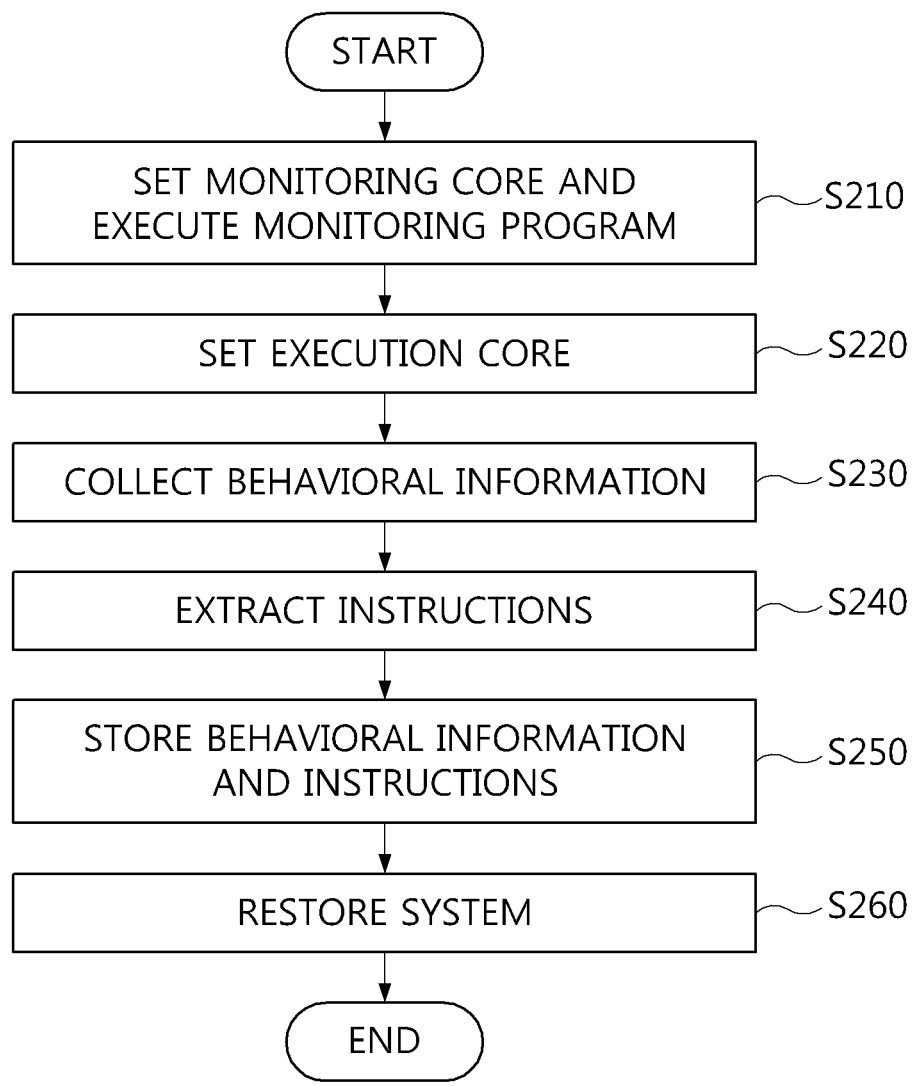
FIG. 2 is an operation flowchart showing a method for analyzing malicious code according to an embodiment of the present invention.
Figure 3:
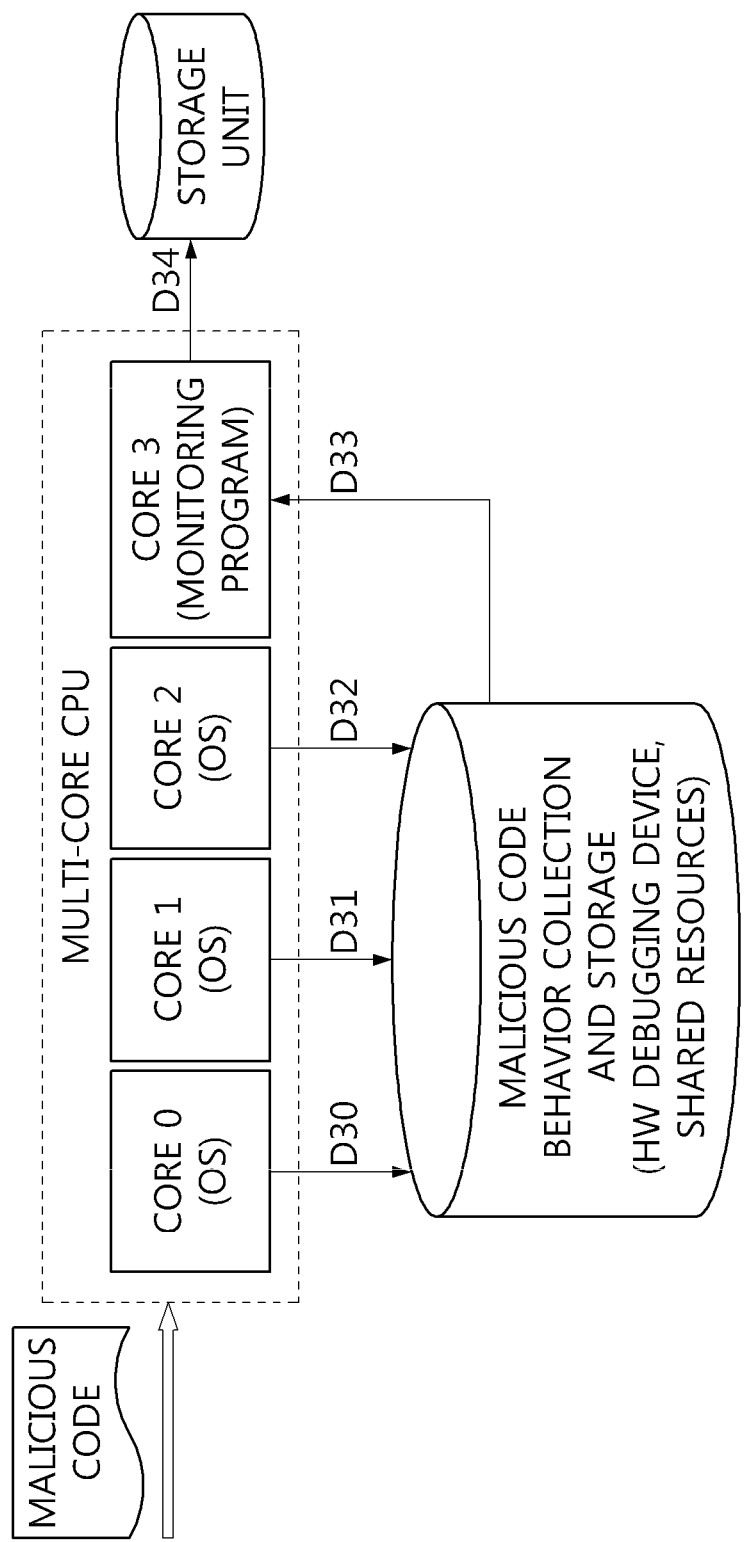
FIG. 3 is a diagram showing a malicious code analysis procedure performed by a multi-core CPU system according to an embodiment of the present invention.

FIG. 2 is an operation flowchart showing a method for analyzing malicious code according to an embodiment of the present invention, and FIG. 3 is a diagram showing a malicious code analysis procedure performed by a multi-core CPU system according to an embodiment of the present invention.

First, the malicious code analysis apparatus 100 sets a monitoring core and executes a monitoring program on the monitoring core at step S210.

The malicious code analysis apparatus 100 sets a monitoring core for monitoring the behavior of a multi-core CPU among multiple cores included in the multi-core CPU. Here, the malicious code analysis apparatus 100 may set one or more monitoring cores, and the set monitoring cores load and execute the monitoring program. As shown in FIG. 3, the malicious code analysis apparatus 100 may set core 3 as the monitoring core, and allow core 3 to load and execute the monitoring program.

The monitoring program is configured to monitor cores, such as core 0, core 1, and core 2 of FIG. 3, which are not selected as the monitoring core from among the cores of the multi-core CPU, and may access shared resources or a hardware debugging device when the analysis target code is executed.

Further, the monitoring program refers to software that can be independently executed without requiring the control of an Operating System (OS). The malicious code analysis apparatus 100 according to the embodiment of the present invention may set the monitoring core by modifying a kernel or modifying data provided to the kernel, and the set monitoring core may be independently operated without requiring the control of an OS.

Next, the malicious code analysis apparatus 100 sets an execution core at step S220.

As shown in FIG. 3, the malicious code analysis apparatus 100 may set a plurality of cores as the execution core. When the malicious code analysis apparatus 100 sets a plurality of cores (core 0, core 1, and core 2), all of core 0, core 1, and core 2 execute the analysis target code, and then generate behavioral information.

More specifically, the malicious code analysis apparatus 100 sets a specific execution core on which the analysis target code is to be executed, and then allows the analysis target code to be executed on the specific core. In contrast, when step S220 of setting the execution core is not performed, the malicious code analysis apparatus 100 allows any one core other than the monitoring core, among the multiple cores included in the multi-core CPU, to execute the analysis target code.

When there is a system having two cores, the malicious code analysis apparatus 100 may set a core, which is not selected as the monitoring core at step S210, as the execution core. Further, step S220 of setting the execution core may be omitted.

Thereafter, the malicious code analysis apparatus 100 collects pieces of behavioral information at step S230.

The malicious code analysis apparatus 100 may access the hardware debugging device using the monitoring program, and may collect behavioral information from the hardware debugging device. Also, the malicious code analysis apparatus 100 may access shared resources, and may collect behavioral information from the shared resources.

As shown in FIG. 3, it is assumed that the malicious code analysis apparatus 100 sets core 3 as the monitoring core. In this case, core 0, core 1, and core 2 load OSs, and execute the analysis target code. Further, actions (behavior) D30, D31, and D32 performed by the analysis target code are collected in the hardware debugging device or the shared resources. In particular, when behavioral information is collected in real time as in the case of CPU instructions, the hardware debugging device is used.

Further the malicious code analysis apparatus 100 collects behavioral information D33 from the hardware debugging device or the shared resources, by using the monitoring program that is loaded and is being executed on core 3.

Figure 4:
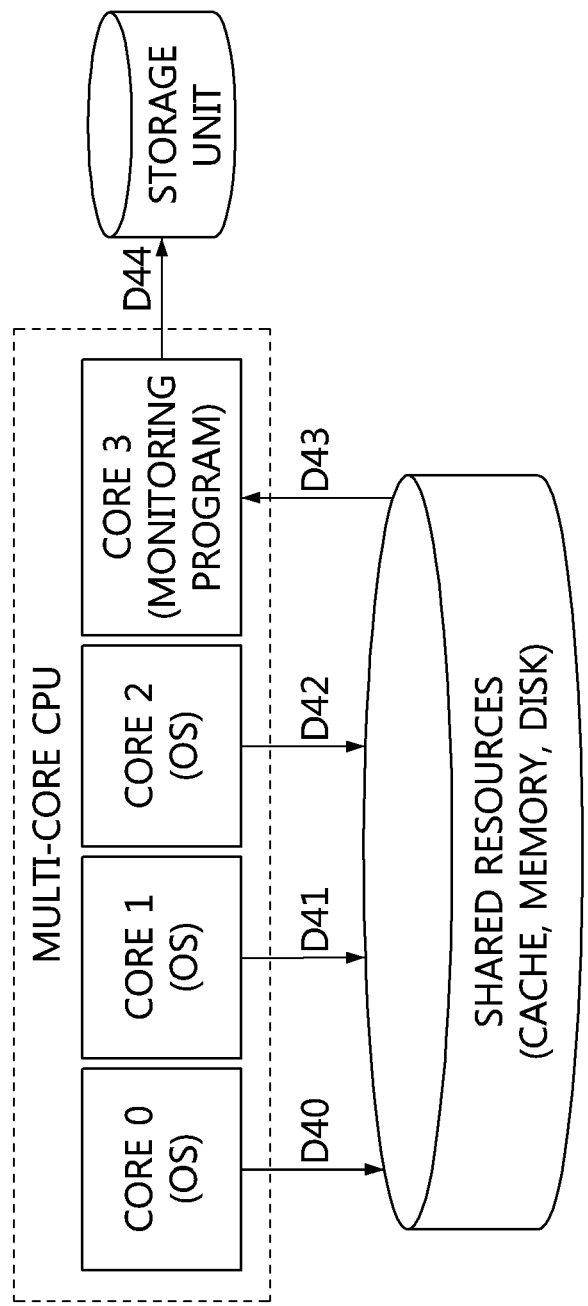
FIG. 4 is a diagram showing the monitoring of core status using the shared resources of the malicious code analysis apparatus according to an embodiment of the present invention.

FIG. 4 is a diagram showing the monitoring of core status using the shared resources of the malicious code analysis apparatus according to an embodiment of the present invention.

As shown in FIG. 4, it is assumed that a CPU system includes four cores (core 0, core 1, core 2, and core 3), and, among the cores, core 3 is a monitoring core. Here, shared resources which are shared by all of the cores may be present. The shared resources may include at least one of cache, memory, and a disk and may be independent resources separate from the storage unit.

Further, the OSs loaded onto core 0, core 1, and core 2 continuously store pieces of data D40, D41, and D42 about the OSs and programs in execution in the shared resources. Furthermore, the monitoring core, that is, core 3, accesses the shared resources and collects data D43 corresponding to core 0, core 1, and core 2.

Then, the malicious code analysis apparatus 100 extracts instructions at step S240.

The instructions are extracted from the behavioral information D33 collected as shown in FIG. 3. At this time, the malicious code analysis apparatus 100 may extract instructions using the hardware debugging device.

Here, the malicious code analysis apparatus 100 may extract the status information of an OS, the status information of an application program, and the status information of the system from the collected behavioral information D33, and may store the extracted information. The status information of the OS may include at least one of a list of processes in execution, a network socket, and a file descriptor, and the status information of the application program may include at least one of a stack corresponding to the status of the analysis target code and data in use.

Further, the malicious code analysis apparatus 100 may extract instructions executed by each execution core using a program flow tracer installed in the CPU. Here, the program flow tracer includes hardware for extracting instructions executed by the CPU and a buffer (program flow trace buffer) for storing the extracted instructions.

Figure 5:
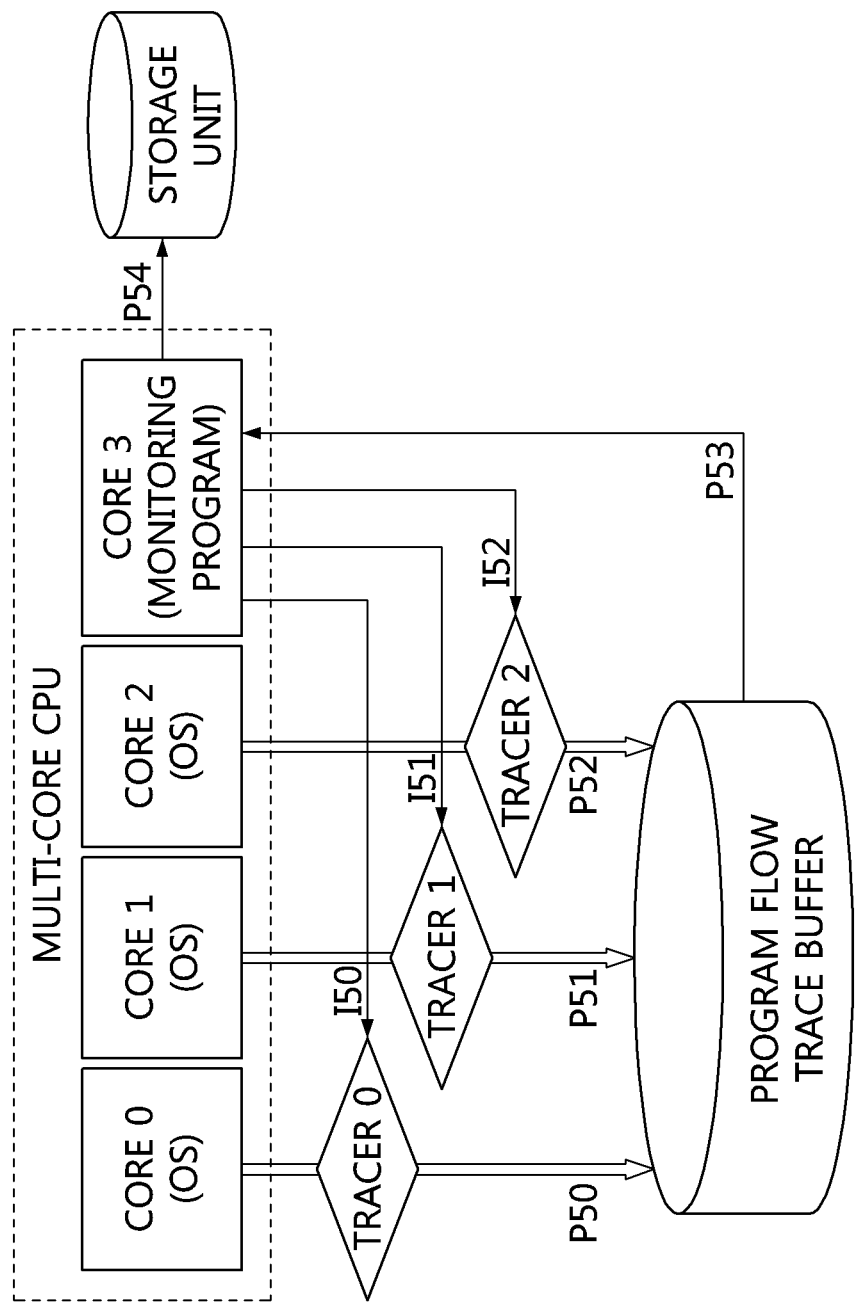
FIG. 5 is a diagram showing the monitoring of core behavior using a program flow trace buffer according to an embodiment of the present invention.

FIG. 5 is a diagram showing the monitoring of core behavior using the program flow trace buffer according to an embodiment of the present invention.

As shown in FIG. 5, the malicious code analysis apparatus 100 may access the program flow trace buffer using program flow tracers, such as tracer 0, tracer 1, and tracer 2.

In the case of a CPU designed by ARM, the program flow tracers may include a Program Trace Macrocell (PTM), an Embedded Trace Macrocell (ETM), an Embedded Trace Buffer (ETB), etc., and in the case of a CPU designed by Intel, the program flow tracers may include a Branch Trace Store (BTS), a Last Branch Record (LBR), a Processor Trace (PT), etc.

As shown in FIG. 5, the malicious code analysis apparatus 100 allows the monitoring program to individually transmit CPU instruction tracing/non-tracing signals I50, I51, and I52 to the tracers of core 0, core 1, and core 2. Further, core 0, core 1, and core 2, which correspond to the tracers having received the CPU instruction tracing/non-tracing signals I50, I51, and I52, store CPU instructions P50, P51, and P52, executed by the respective cores, in the program flow trace buffer. Furthermore, core 3 that executes the monitoring program accesses the program flow trace buffer and collects extracted instructions P53 therefrom.

Also, the malicious code analysis apparatus 100 according to the embodiment of the present invention may set a specific core as an execution core, and may execute analysis target code only on the execution core. Further, the monitoring core may extract and collect only instructions that are stored by the execution core in the program flow trace buffer.

Figure 6:
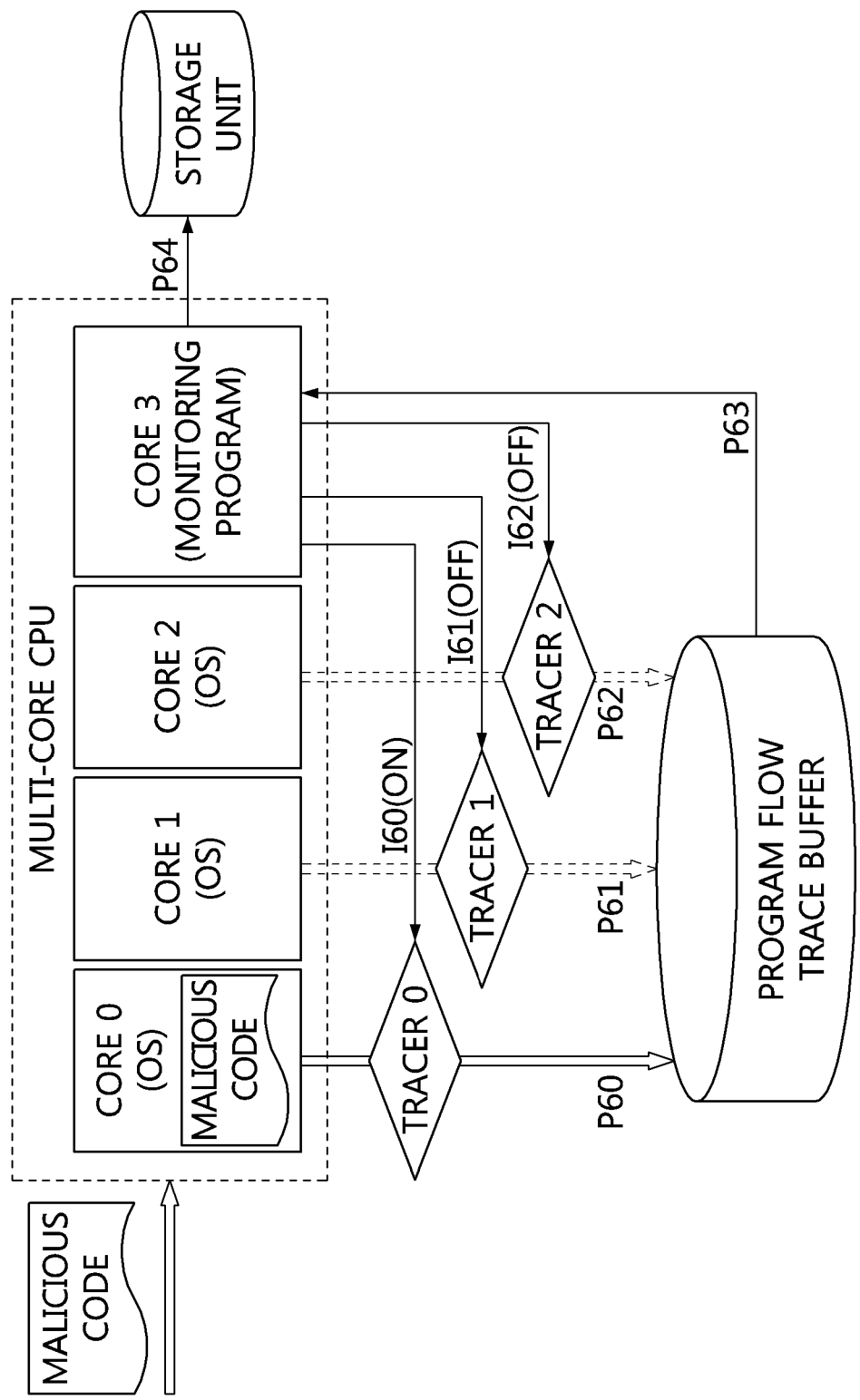
FIG. 6 is a diagram showing control required to execute malicious code only in a set core according to an embodiment of the present invention.

FIG. 6 is a diagram showing control required to execute malicious code only in a set core according to an embodiment of the present invention.

As shown in FIG. 6, in the malicious code analysis apparatus 100, a monitoring program may set core 0 as an execution core, may transmit an activation signal I60 (ON) to tracer 0, and may transmit deactivation signals I61 (OFF) and I62 (OFF) to tracer 1 and tracer 2 corresponding to core 1 and core 2, respectively.

Further, only the tracer 0 having received the activation signal I60 (ON) stores a CPU instruction P60 in the program flow trace buffer, and the monitoring core, that is, core 3, may access the program flow trace buffer to collect instructions P63 extracted from core 0.

When the malicious code analysis apparatus 100 according to the embodiment of the present invention sets the execution core, as shown in FIG. 6, and the set execution core executes the analysis target code, the number of cores that are targets to be monitored is 1, and thus the range of monitoring may be narrowed. Further, the number of CPU instructions stored in the program flow trace buffer may be reduced, with the result that the time and resources required to extract and analyze the behavior of the analysis target code may be reduced owing to the reduced number of CPU instructions.

Thereafter, the malicious code analysis apparatus 100 stores the collected behavioral information and extracted instructions at step S250.

As shown in FIG. 3, the malicious code analysis apparatus 100 stores the results of analysis D34 in the storage unit. Here, the analysis results D34 include behavioral information collected at step S230 and the instructions extracted at step S240.

Further, the malicious code analysis apparatus 100 may align and store the analysis results D34 based on at least one of behavior performance cores and behavior performance times corresponding to the analysis results D34.

Finally, the malicious code analysis apparatus 100 restores the system using the behavioral information at step S260.

The malicious code analysis apparatus 100 may restore the system only when the analysis target code is determined to be malicious code or only when a system file is modified, according to the need or setting. Further, the malicious code analysis apparatus 100 may restore the system at step S260, and thereafter analyze malicious code in another analysis target code.

In accordance with the present invention, the behavior of malicious code that recognizes and bypasses a virtual machine and a sandbox may be monitored and analyzed.

Further, the present invention enables a commercial CPU to be applied to PC- and mobile-based malicious code analysis without requiring an additional device, by utilizing the commercial CPU.

Furthermore, the present invention may extract and analyze real-time behavior or intermediate behavior of malicious code as well as the results of the behavior because malicious code is monitored outside of the malicious code execution environment. Then, by means of this extraction and analysis, malicious code may be more precisely and exactly analyzed.

As described above, in the apparatus and method for analyzing malicious code in a multi-core environment according to the present invention, the configurations and schemes in the above-described embodiments are not limitedly applied, and some or all of the above embodiments can be selectively combined and configured so that various modifications are possible.

What is claimed is:

1. An apparatus for analyzing malicious code, comprising:
a core setting unit for setting at least one monitoring core, on which malicious code is to be monitored, among cores of a multi-core Central Processing Unit (CPU), and executing a monitoring program on the monitoring core;
a behavioral information collection unit for, when execution cores that are not set as the monitoring core execute analysis target code, collecting pieces of behavioral information using the monitoring program and a hardware debugging device;
a storage unit for storing the behavioral information;
a restoration unit for analyzing a status of the system using the collected behavioral information or restoring the system to the status at a specific time; and
an instruction extraction unit for extracting instructions executed by the execution cores using a program flow tracer and a program flow trace buffer installed on the CPU,
wherein the program flow tracer sets information about whether a program flow is to be traced for each core by the monitoring core, and
wherein the storage unit aligns and stores the pieces of behavioral information based on behavior performance cores and behavior performance times corresponding to the pieces of behavioral information.

2. The apparatus of claim 1, wherein the behavioral information collection unit collects the behavioral information from shared resources that are shared by the cores of the multi-core CPU.

3. The apparatus of claim 2, wherein the shared resources include at least one of a disk, memory, and cache, and are independent resources separate from the storage unit.

4. The apparatus of claim 2, wherein the behavioral information collected from the shared resources includes at least one of current status of an operating system, status of the analysis target code, and status of a system.

5. The apparatus of claim 4, wherein: the current status of the operating system includes at least one of a list of processes in execution, a network socket, and a file descriptor, and the status of the analysis target code includes at least one of a stack and data in use.

6. The apparatus of claim 1, wherein the core setting unit sets a core on which the analysis target code is to be executed among execution cores.

7. A method for analyzing malicious code using a malicious code analysis apparatus, comprising:
setting at least one monitoring core, on which malicious code is to be monitored, among cores of a multi-core Central Processing Unit (CPU);
executing a monitoring program on the monitoring core;
when execution cores that are not set as the monitoring core execute analysis target code, collecting pieces of behavioral information using the monitoring program and a hardware debugging device;
storing the behavioral information;
analyzing a status of the system using the collected behavioral information or restoring the system to the status at a specific time; and extracting instructions executed by the execution cores using a program flow tracer and a program flow trace buffer installed on the CPU, wherein extracting the instructions executed by the execution cores is configured such that the monitoring core allows the program flow tracer to set information about whether a program flow is to be traced for each core, and wherein storing the behavioral information is configured to align and store the pieces of behavioral information based on behavior performance cores and behavior performance times corresponding to the pieces of behavioral information.

8. The method of claim 7, wherein collecting the behavioral information is configured to collect the behavioral information from shared resources that are shared by the cores of the multi-core CPU.

9. The method of claim 8, wherein the shared resources include at least one of a disk, memory, and cache, and are independent resources separate from a storage unit of the malicious code analysis apparatus.

10. The method of claim 8, wherein the behavioral information collected from the shared resources includes at least one of current status of an operating system, status of the analysis target code, and status of a system.

11. The method of claim 10, wherein: the current status of the operating system includes at least one of a list of processes in execution, a network socket, and a file descriptor, and the status of the analysis target code includes at least one of a stack and data in use.

12. The method of claim 7, further comprising setting a core on which the analysis target code is to be executed among execution cores.

\* \* \* \* \*